United States Patent [19]

Lee

[11] 4,130,734
[45] Dec. 19, 1978

[54] ANALOG AUDIO SIGNAL BANDWIDTH COMPRESSOR

[75] Inventor: Harry T. Lee, Sunnyvale, Calif.

[73] Assignee: Lockheed Missiles & Space Company, Inc., Sunnyvale, Calif.

[21] Appl. No.: 863,959

[22] Filed: Dec. 23, 1977

[51] Int. Cl.$^2$ ............................ H04J 3/18; G10L 1/00
[52] U.S. Cl. ............................ 179/15.55 R; 179/1 SA
[58] Field of Search ....... 179/15.55 R, 1 SA, 107 FD

[56] References Cited

U.S. PATENT DOCUMENTS

| 3,102,929 | 9/1963 | De Jager et al. | 179/15.55 R |
| 3,499,991 | 3/1970 | Cassel et al. | 179/1 SA |

Primary Examiner—Kathleen H. Claffy
Assistant Examiner—E. S. Kemeny
Attorney, Agent, or Firm—H. Donald Volk; Billy G. Corber

[57] ABSTRACT

The analog bandwidth compressor of the present system preserves the actual frequencies of the detected signal. This is accomplished by feeding the detected signal to a bank of contiguous filters and feeding the outputs of each of these filters to an AM detector and a frequency divider. The output from each frequency divider is fed to a tunable filter bank. The outputs of the tunable filter bank are fed to multipliers where the outputs from the associated AM detectors are superimposed on the frequency signals from the tunable filter bank. The output of the plurality of multipliers is fed to a summing network which provides a reduced bandwidth signal. The output of the summing network is subsequently fed through a transmission system to a bandwidth restoration circuit which consists of a tunable contiguous filter bank, AM detector, frequency multiplier, tunable filter bank, multipliers and a summer similar to the bandwidth reduction circuit.

11 Claims, 2 Drawing Figures

4,130,734

ANALOG AUDIO SIGNAL BANDWIDTH COMPRESSOR

BACKGROUND OF THE INVENTION

There is a growing worldwide need to expand the amount of communication that can be carried by audio communication channels, in both radio transmission and hardwired communications systems.

One technique to make better use of the frequency bandwidth of speech and other transmission channels is to use a bandwidth compression arrangement that would allow for transmission of the information content of the speech through a channel having a bandwidth substantially narrower than that required for transmission of the speech wave itself. Most of the systems are based upon the channel vocoder of H. W. Dudley described in U.S. Pat. No. 2,151,031, issued May 21, 1939.

These prior art systems suffer from a disadvantage of producing an artificial sounding output. This is caused by the vocoder's technique of preserving only the amplitude while passing a frequency that is not the true frequency but is representative of the middle frequency of the individual channel's passband. Additionally, many of the prior art systems rely on digital transmission channels, a limitation not present in the described invention.

In addition to bandwidth compression, the present invention is equally capable of bandwidth expansion for spread spectrum transmission applications and frequency normalizing for variable speed tape scanning.

SUMMARY OF THE INVENTION

The preferred embodiment of the invention shows an analog bandwidth compression system employing spectral compaction. The input is fed to a bank of contiguous filters. The output of each of the filters is fed to an AM detector and a frequency divider. Each frequency divider output is fed to one channel of a tunable filter bank. The output of each tunable filter is fed to a multiplier along with the output from the AM detector. The multipliers superimpose the amplitude information from the associated AM detectors onto the signals from the tunable filter bank.

The outputs from all the multipliers are fed to a summer which provides a reduced bandwidth output signal representative of the input signal. This output is fed to a bandwidth restoration circuit which is quite similar to the spectral compaction circuit.

BRIEF DESCRIPTION OF THE DRAWINGS

Other objects and advantages of this invention will be readily appreciated and the same can be understood by reference to the following detailed description when considered in connection with the accompanying drawings, wherein.

DESCRIPTION OF THE PREFERRED EMBODIMENT

Figure 1:
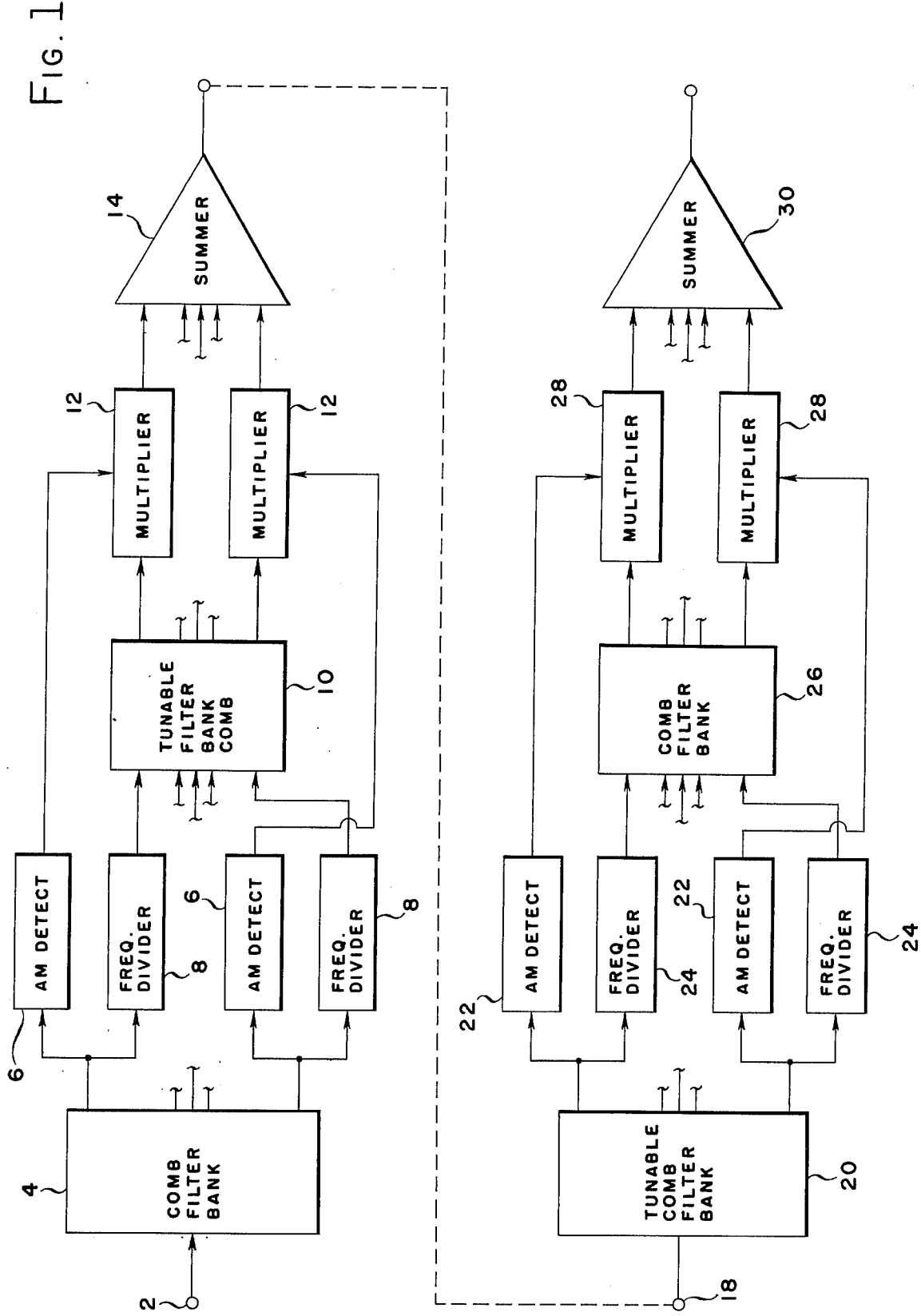
FIG. 1 is a block diagram of the analog bandwidth compression and expansion system of the present invention.

Referring to FIG. 1, audio signals entering the system by way of input terminal 2 are fed to a comb filter bank 4. The comb filter bank 4 consists of a bank of contiguous bandpass filters that span the frequency range of the human voice. These bandpass filters separate portions of the incoming voice signal energy into individual channels, each channel providing a signal component used to derive a spectral representation of the input signal.

The output of each of the filters in the comb filter bank 4 is connected to an AM detector 6 and to a frequency multiplier 8. The AM detector provides an output having a magnitude representative of the magnitude of the signal received from its respective filter in filter bank 4.

The frequency multiplier 8 provides an output having a frequency equal to the input frequency times a predetermined constant 1/R where said constant is less than one when bandwidth reduction is intended.

The outputs from all the frequency multipliers 8 are fed to a tunable filter bank 10 which suppresses harmonic distortions present on the converted frequency output. The tunable filter bank 10 is similar, having the same shape in all channels to filter bank 4, except that the upper and lower cutoff frequencies in each passband are both reduced by the bandwidth reduction ratio R which has the same value as the constant used in frequency divider 8. The ratio constant R may be fixed or variable depending on the intended use of the disclosed system. Variable tuning which is suitable for the present invention is disclosed in the U.S. Pat. No. 4,009,400 to R. W. Harris and H. T. Lee which issued on Feb. 22, 1977. The output of each passband from the tunable filter bank is fed to a multiplier 12. Multiplier 12 superimposes the amplitude information received from AM detector 6 onto the respective frequency output from tunable filter bank 10. The output from the bank of multipliers 12 are fed to a summer 14. The output from summer 14 is a signal having reduced bandwidth from the original input signal. This output could be fed to a transmission means, a recording or the like.

A bandwidth restoration circuit for restoring the input signal to its original frequency and amplitude includes an input terminal 18 connected to a comb filter bank 20 similar to the comb filter bank 10 in the spectral compaction circuit. Each output from the comb filter bank 20 is fed to an AM detector 22 and a frequency multiplier 24. The AM detector 22 operates on its input signal, similar to the AM detector 6 in the spectral compaction circuit, to provide an output representative of the magnitude of the input signal. The frequency multiplier 24 provides an output having a frequency of the input frequency times a predetermined constant where the constant is the inverse of the constant utilized in frequency multiplier 8. The output from each of the frequency multipliers 24 is fed to a comb filter bank 26. Each output from the comb filter bank 26 is fed to a multiplier 28 where the magnitude of the respective original frequency information is superimposed upon that frequency. The outputs from the bank of multipliers 28 are fed to a summer 30 which provides an output having the actual frequencies of the signal fed to input terminal 2 and having the respective magnitudes of the original signal frequencies fed into the terminal 2.

Figure 2:
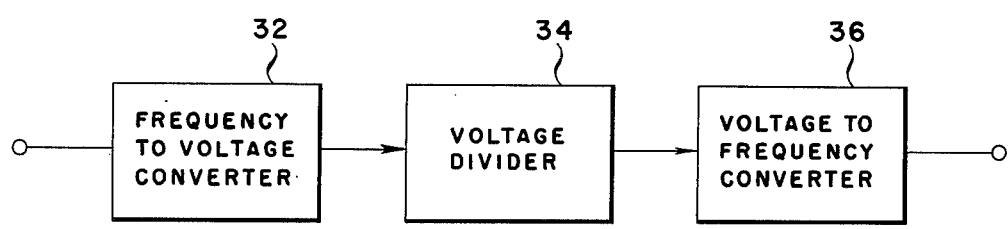
FIG. 2 is a block diagram of a frequency multiplier usable in the circuit of FIG. 1.

FIG. 2 shows the details of a frequency multiplier usable in the circuit of FIG. 1. This circuit consists of a frequency to voltage converter 32, a voltage divider 34 and a voltage to frequency converter 36. The frequency to voltage converter 32 converts the input frequency to a voltage signal. This voltage signal is fed to a voltage divider, which can be fixed or adjustable, that provides an output that is equal to its input times a constant. The output from the voltage divider is fed to a voltage to frequency converter 36 which reconverts the voltage back to a signal containing a frequency information. The voltage division 34 is accomplished using simple fixed resistance dividing circuitry, variable potentiometers or a digitally controlled variable conductance as discussed in the aforementioned U.S. Pat. No. 4,009,400. Voltage multiplication is accomplished by adding a fixed gain voltage amplifier to the dividing circuit in any one of a number of ways well known in the art. Such multiplication circuits are considered in detail in the text "Circuits, Devices, and Systems" (Wiley, 1966) by Ralph J. Smith, on page 672.

The signal multipliers 12 and 28 may be made by conventional methods using any of a number of commercially available integrated circuits (IC's). One such IC suitable for the present invention is the Burr-Brown 4203J. It should be noted that it is possible to insert the multipliers 12 and 28 ahead of the comb filter banks 10 and 26 with no change in the function of the invention. This alternative configuration could be employed if filters 10 and 26 have sufficient dynamic range to span the signal level's output from the multipliers. This range consideration does not apply to the preferred embodiment shown.

The performance of the invention may be enhanced by the introduction of noise in the higher frequency multipliers 24 prior to summer 30. This enhancement is obtained for speech transmissions due to the noiselike nature of unvoiced speech in the upper frequencies in contrast to the sinusoidal characteristics of voiced speech in the lower frequencies. A corresponding compensation in the AM detection output level must then be made so that the total energy in each channel remains in proportion to that at the original inputs 20 and 22. Such modifications and refinements are considered apparent to those having ordinary skill in the art.

It is possible to accomplish reduction and restoration with the same basic circuits when all filter banks are tunable and the frequency multiply/divide circuitry provides for R greater or less than unity. Such a configuration would provide a single half-duplex send/receive capability for narrow band transmission systems.

Other modifications and advantageous applications of this invention will be apprent to those having ordinary skill in the art. Therefore, it is intended that the matter contained in the foregoing description and the accompanying drawings be interpreted as illustrative and not limitative, the scope of the invention being defined by the appended claims.

What is claimed is:

1. An analog bandwidth compressor comprising:
    means for separating incoming voice signal energy into individual channels,
    first and second means connected to each of said individual channels,
    each of said first means providing an output having a magnitude representative of the magnitude of the signal received from its respective individual channel,
    each of said second means providing an output having a frequency equal to the output frequency of the respective separating means times a predetermined constant, where said constant is less than one,
    tunable filter means for suppressing harmonic distortions connected to the output of said second means,
    multiplier means connected to each of said first means and the respective output of said filter means for superimposing the magnitude information onto the respective frequency output from said filter means,
    summing means attached to the output of each of said multiplier means for summing said outputs from the multiplier means and providing an output signal having reduced signal bandwidth from that of the original input signal to said bandwidth compressor.

2. The analog bandwidth compressor system as defined in claim 1 wherein said second means is a frequency divider and said separating means is a comb filter bank.

3. The analog bandwidth compressor system as defined in claim 2 wherein said frequency divider includes a frequency to voltage converter means, a voltage divider means operably connected to the output of said voltage converter means and a voltage to frequency converter operably connected to the output of said voltage divider.

4. An analog bandwidth expander comprising:
    terminal means for receiving an audio signal,
    means for spectrally separating the audio signal into individual channels,
    a plurality of first and second means having input terminals connected to each of said individual channels,
    each of said first means providing an output having a magnitude representative of the magnitude of the signal received from its respective individual channel,
    each of said second means providing an output having a frequency equal to the output frequency of the respective channel times a predetermined constant, where said constant is greater than one,
    filter means connected to the output of each of said second means for suppressing harmonic distortion,
    multiplier means connected to each of said first means and the respective output of said filter means for superimposing the magnitude information onto the respective frequency output from said filter means,
    and a common summing means attached to each of said multiplier means to provide an output signal having a bandwidth greater than the bandwidth of said audio signal.

5. The analog bandwidth expander of claim 4 wherein said second means is a frequency divider and said separating means is a comb filter bank.

6. The analog bandwidth compressor system as defined in claim 5 wherein said frequency divider includes a frequency to voltage converter means, a voltage divider means operably connected to the output of said frequency to voltage converter means and a voltage to frequency converter operably connected to the output of said voltage divider.

7. An audio signal processing system comprising:
    a bandwidth compressor means and a bandwidth expander means, said bandwidth compressor means further defined as including:
    terminal means for receiving an audio signal,
    means for spectrally separating the audio input into individual channels,
    first means connected to each of said individual channels for providing an output having a magnitude representative of the magnitude of the signal received from its respective individual channel,
    second means connected to each of said individual channels for providing an output having a frequency equal to the output frequency of the respective separating times a predetermined constant, tunable filter means connected to the output of said second means for suppressing harmonic distortions, multiplier means connecting each of said first means and the respective output of said filter means for superimposing the magnitude information onto the respective frequency output from said filter means, a common summing means attached to the output of each of said multiplier means for summing said outputs from the multiplier means and providing an output signal having reduced signal from the original input signal to said bandwidth compressor, said analog bandwidth expander further defined as including:

terminal means for receiving an audio signal, means for spectrally separating the audio signal into individual channels, a plurality of third and fourth means having input terminals connected to each of said individual channels, each of said third means providing an output having a magnitude representative of the magnitude of the signal received from its respective individual channel, each of said fourth means providing an output having a frequency equal to the output frequency of the respective channel times a predetermined constant, where said constant is greater than one, filter means connected to the output of each of said fourth means for suppressing harmonic distortion, multiplier means connected to each of said first means and the respective output of said filter means for superimposing the magnitude information onto the respective frequency output from said filter means, a common summing means attached to each of said multiplier means for providing an output signal having a bandwidth greater than the bandwidth of said audio signal, interconnecting means connecting the output from said summing means of said bandwidth compressor means to the input terminal means of said bandwidth expander means.

8. The audio signal processing system as defined in claim 7 wherein said interconnecting means is a transmission means.

9. The audio signal processing system as defined in claim 8 wherein said transmission means is further defined as a radio transmission means.

10. The audio signal processing system as defined in claim 8 wherein said transmission means is further defined as a hardwired transmission means.

11. The audio signal processing system as defined in claim 8 wherein said transmission means is further defined as a recording means.

* * * * *